Oct. 31, 1961  W. MANDLER  3,006,249
PHOTOGRAPHIC OBJECTIVE
Filed Sept. 30, 1958

INVENTOR.
WALTER MANDLER
BY Toulmin & Toulmin

ATTORNEYS

United States Patent Office 3,006,249
Patented Oct. 31, 1961

3,006,249
PHOTOGRAPHIC OBJECTIVE
Walter Mandler, Midland, Ontario, Canada, assignor to Ernst Leitz Canada Limited, Midland, Ontario, Canada
Filed Sept. 30, 1958, Ser. No. 764,339
Claims priority, application Germany Oct. 1, 1957
3 Claims. (Cl. 88—57)

The present invention relates to photographic objectives.

More particularly, the present invention relates to high speed photographic objectives, and it is an object of the instant invention to provide a high speed wide angle objective which has an angular field of 62°.

With the above object in view, the present invention resides mainly in a high speed photographic objective which comprises two groups of elements, which groups are arranged on opposite sides of a diaphragm and are substantially symmetrical with respect thereto. Each group comprises four concave meniscal elements each of which faces the diaphragm with its concave side. The element nearest the diaphragm and the element farthest from the diaphragm are each positive, and the two remaining elements together are negative. If desired, these last-mentioned two elements may be cemented to each other and form a composite negative meniscus.

The present invention further resides in the provision of photographic objectives which are built in accordance with the examples set forth below.

Figure 1:
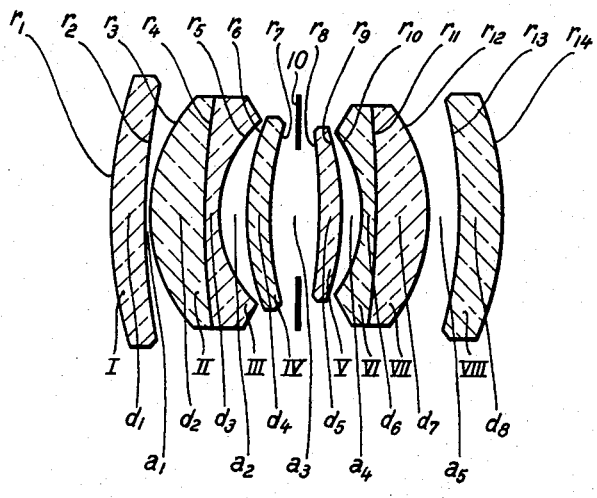
Figure 2:
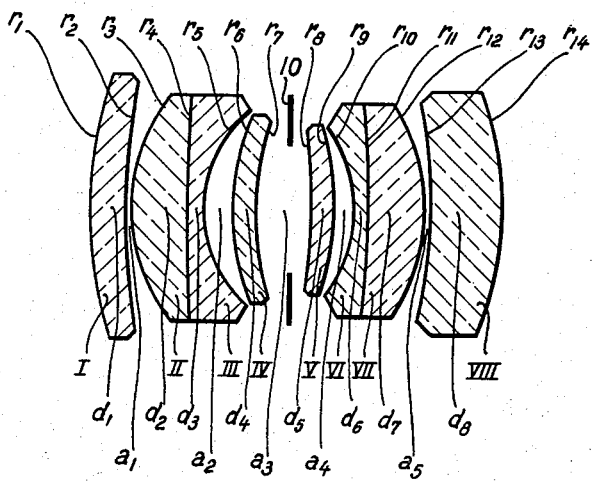

Two embodiments of an objective according to the present invention are illustrated in FIGS. 1 and 2 of the accompanying drawing. Each objective will be seen to include eight concavo-convex elements I through VIII, these elements being arranged in two groups of elements one on each side of a diaphragm shown diagrammatically at 10. One of the groups comprises elements I through IV and the other group comprises elements V through VIII, and these groups are substantially symmetrical with respect to the diaphragm. In each group, the element nearest the diaphragm as well as the element farthest from the diaphragm, i.e., the elements I, IV, V and VIII, is a positive meniscus, whereas the two remaining elements of each group together form a negative meniscus, i.e., the elements II and III of the left-hand group and the elements VI and VII of the right-hand group, as viewed in the drawing, form negative menisci.

If desired, the elements II and III of the left-hand group and the elements VI and VII of the right-hand group may be cemented together so as to form composite negative elements II, III and VI, VII.

Two practical examples of objectives according to the present invention are set forth herewith, with the objective according to Example I being illustrated in FIG. 1 and the objective according to Example II being illustrated in FIG. 2.

In the following tables $r_1, r_2 \ldots$ represent the radii of the individual surfaces, $d_1, d_2 \ldots$ represent the thicknesses of the individual elements, $a_1, a_2 \ldots$ represent the axial separations between the elements, $N_D$ is the index of refraction for the sodium D line, and $V$ is the Abbe number.

Example I

[$f_o$ = 100 mm.—F:2]

| | Radii | Thicknesses and Axial Separations | $N_D$ | $V$ |
|---|---|---|---|---|
| I | $r_1 = +87.0$ | | | |
| | $r_2 = +121.4$ | $d_1 = 6.9$ | 1.7440 | 44.9 |
| | | $a_1 = 0.6$ | | |
| II | $r_3 = +33.1$ | $d_2 = 10.4$ | 1.7440 | 44.9 |
| | $r_4 = +147.9$ | | | |
| III | $r_5 = +24.2$ | $d_3 = 3.0$ | 1.6668 | 33.09 |
| | | $a_2 = 5.4$ | | |
| IV | $r_6 = +49.4$ | $d_4 = 4.4$ | 1.7200 | 50.31 |
| | $r_7 = +60.7$ | | | |
| | | $a_3 = 10.0$ | | |
| V | $r_8 = -117.9$ | $d_5 = 4.4$ | 1.7200 | 50.31 |
| | $r_9 = -52.2$ | | | |
| | | $a_4 = 3.9$ | | |
| VI | $r_{10} = -26.2$ | $d_6 = 3.0$ | 1.6989 | 30.05 |
| | $r_{11} = -182.1$ | | | |
| VII | $r_{12} = -34.4$ | $d_7 = 10.4$ | 1.7440 | 44.9 |
| | | $a_5 = 6.0$ | | |
| VIII | $r_{13} = -84.3$ | $d_8 = 8.9$ | 1.7440 | 44.9 |
| | $r_{14} = -61.9$ | | | |

Example II

[$f_o$ = 100 mm.—F:2]

| | Radii | Thicknesses and Axial Separations | $N_D$ | $V$ |
|---|---|---|---|---|
| I | $r_1 = +82.9$ | $d_1 = 7.5$ | 1.7440 | 44.9 |
| | $r_2 = +116.4$ | | | |
| | | $a_1 = 0.66$ | | |
| II | $r_3 = +36.1$ | $d_2 = 11.3$ | 1.7440 | 44.9 |
| | $r_4 = +285.7$ | | | |
| III | $r_5 = +25.4$ | $d_3 = 3.2$ | 1.6477 | 33.88 |
| | | $a_2 = 5.9$ | | |
| IV | $r_6 = +48.6$ | $d_4 = 4.8$ | 1.7200 | 50.31 |
| | $r_7 = +57.8$ | | | |
| | | $a_3 = 10.9$ | | |
| V | $r_8 = -128.3$ | $d_5 = 4.8$ | 1.7200 | 50.31 |
| | $r_9 = -56.8$ | | | |
| | | $a_4 = 3.6$ | | |
| VI | $r_{10} = -28.6$ | $d_6 = 3.2$ | 1.6989 | 30.05 |
| | $r_{11} = -198.3$ | | | |
| VII | $r_{12} = -39.2$ | $d_7 = 11.3$ | 1.7880 | 47.44 |
| | | $a_5 = 0.66$ | | |
| VIII | $r_{13} = -103.3$ | $d_8 = 14.3$ | 1.7440 | 44.9 |
| | $r_{14} = -66.8$ | | | |

In the embodiment of Example II, the glass of element VII may have approximately the following composition:

| Component: | Percentage by weight |
|---|---|
| $B_2O_3$ | 30 |
| $LaO_3$ | 49 |
| $CdO$ | 13 |
| $ZrO_2$ | 4 |
| $Ta_2O_5$ | 4 |

It will be understood that this invention is susceptible to modifications in order to adapt it to different usages and conditions, and, accordingly, it is desired to comprehend such modifications within this invention as may fall within the scope of the appended claims.

What is claimed is:

1. A high speed photographic objective comprising two groups of elements which groups are arranged on opposite sides of a diaphragm and are substantially symmetrical with respect thereto, each group comprising four concavo-convex meniscal elements each of which faces the diaphragm with its concave side, the element nearest the diaphragm and the element farthest from the diaphragm each being a positive element and the two remaining elements being cemented together and forming a composite negative element, said photographic objective being constructed substantially in accordance with the following data:

[$f=100$ mm.—F:2]

| | Radii | Thicknesses and Axial Separations | $N_D$ | V |
|---|---|---|---|---|
| I | $r_1 = +87.0$ | $d_1 = 6.9$ | 1.7440 | 44.9 |
| | $r_2 = +121.4$ | $a_1 = 0.6$ | | |
| II | $r_3 = +33.1$ | $d_2 = 10.4$ | 1.7440 | 44.9 |
| | $r_4 = +147.9$ | | | |
| III | $r_5 = +24.2$ | $d_3 = 3.0$ | 1.6668 | 33.09 |
| | | $a_2 = 5.4$ | | |
| IV | $r_6 = +49.4$ | $d_4 = 4.4$ | 1.7200 | 50.31 |
| | $r_7 = +60.7$ | | | |
| | | $a_3 = 10.0$ | | |
| V | $r_8 = -117.9$ | $d_5 = 4.4$ | 1.7200 | 50.31 |
| | $r_9 = -52.2$ | | | |
| | | $a_4 = 3.9$ | | |
| VI | $r_{10} = -26.2$ | $d_6 = 3.0$ | 1.6989 | 30.05 |
| | $r_{11} = -182.1$ | | | |
| VII | | $d_7 = 10.4$ | 1.7440 | 44.9 |
| | $r_{12} = -34.4$ | | | |
| | | $a_5 = 6.0$ | | |
| VIII | $r_{13} = -84.3$ | $d_8 = 8.9$ | 1.7440 | 44.9 |
| | $r_{14} = -61.9$ | | | | wherein $r_1, r_2 \ldots$ represent the radii of the individual surfaces of the elements, $d_1, d_2 \ldots$ represent the thicknesses of the elements, $a_1, a_2 \ldots$ represent the axial separations between the elements, $N_D$ is the index of refraction for the sodium D line, and V is the Abbe number.

2. A high speed photographic objective comprising two groups of elements which groups are arranged on opposite sides of a diaphragm and are substantially symmetrical with respect thereto, each group comprising four concavo-convex meniscal elements each of which faces the diaphragm with its concave side, the element nearest the diaphragm and the element farthest from the diaphragm each being a positive element and the two remaining elements being cemented together and forming a composite negative element, said photographic objective being constructed substantially in accordance with the following data:

[$f=100$ mm.—F:2]

| | Radii | Thicknesses and Axial Separations | $N_D$ | V |
|---|---|---|---|---|
| I | $r_1 = +82.9$ | $d_1 = 7.5$ | 1.7440 | 44.9 |
| | $r_2 = +116.4$ | | | |
| | | $a_1 = 0.66$ | | |
| II | $r_3 = +36.1$ | $d_2 = 11.3$ | 1.7440 | 44.9 |
| | $r_4 = +285.7$ | | | |
| III | $r_5 = +25.4$ | $d_3 = 3.2$ | 1.6477 | 33.88 |
| | | $a_2 = 5.9$ | | |
| IV | $r_6 = +48.6$ | $d_4 = 4.8$ | 1.7200 | 50.31 |
| | $r_7 = +57.8$ | | | |
| | | $a_3 = 10.9$ | | |
| V | $r_8 = -128.3$ | $d_5 = 4.8$ | 1.7200 | 50.31 |
| | $r_9 = -56.8$ | | | |
| | | $a_4 = 3.6$ | | |
| VI | $r_{10} = -28.6$ | $d_6 = 3.2$ | 1.6989 | 30.05 |
| | $r_{11} = -192.3$ | | | |
| VII | | $d_7 = 11.3$ | 1.7880 | 47.44 |
| | $r_{12} = -39.2$ | | | |
| | | $a_5 = 0.66$ | | |
| VIII | $r_{13} = -103.3$ | $d_8 = 14.3$ | 1.7440 | 44.9 |
| | $r_{14} = -66.8$ | | | | wherein $r_1, r_2 \ldots$ represent the radii of the individual surfaces of the elements, $d_1, d_2 \ldots$ represent the thicknesses of the elements, $a_1, a_2 \ldots$ represent the axial separations between the elements, $N_D$ is the index of refraction for the sodium D line, and V is the Abbe number.

3. A photographic objective as defined in claim 2 wherein element VII has approximately the following composition:

| Component: | Percentage by weight |
|---|---|
| $B_2O_3$ | 30 |
| $LaO_3$ | 49 |
| CdO | 13 |
| $ZrO_2$ | 4 |
| $Ta_2O_5$ | 4 |

References Cited in the file of this patent

UNITED STATES PATENTS

| 2,130,760 | Warmisham | Sept. 20, 1938 |
| 2,601,592 | Cook | June 24, 1952 |
| 2,601,594 | Cook | June 24, 1952 |
| 2,671,380 | Baker | Mar. 9, 1954 |
| 2,676,517 | Cook | Apr. 27, 1954 |
| 2,701,982 | Angenieux | Feb. 15, 1955 |
| 2,774,280 | Cook | Dec. 18, 1956 |
| 2,828,671 | Murakami | Apr. 1, 1958 |